June 5, 1962

A. FINLAY ETAL 3,038,050

CONTROL APPARATUS

Filed May 13, 1959

INVENTORS:
ALEXANDER FINLAY
BY DAVID R. RICE.

ATTORNEY.

United States Patent Office 3,038,050
Patented June 5, 1962

3,038,050
CONTROL APPARATUS
Alexander Finlay, Columbus, Ohio, and David R. Rice, Morristown, N.J., assignors, by mesne assignments, to Ranco Incorporated, Columbus, Ohio, a corporation of Ohio
Filed May 13, 1959, Ser. No. 812,944
5 Claims. (Cl. 200—122)

Then present invention relates to control apparatus and more particularly to apparatus suitable for controlling heating elements, such as employed in electric cook stoves, according to the temperature of cooking vessels on the heating elements.

It is desirable to provide control apparatus for electric cook stoves of the type referred to having an adjusting member, such as a knob, which permits the user to select the cooking temperature and to also select the rate of boiling when cooking is to be done at water boiling temperature. For maximum efficiency, it is essential that the heating unit be energized at full capacity to raise the temperature of the cooking vessel quickly to approximately that desired, after which the energization of the unit should occur intermittently with longer "off" periods as the temperature approaches that selected so as to prevent over-riding of the temperature and to accurately maintain the proper cooking temperature.

The principal object of the present invention is the provision of an improved control apparatus particularly suitable for the control of heating units of electric stoves having the desirable features mentioned and particularly providing for inherent establishment of operating characteristics which cycle the heating unit only after the temperature of the cooking vessel has been brought to a degree near that desired and which provides for establishment of a suitable rate of boil range within a given range of movement of the temperature selection member.

A more specific object of the invention is the provision of improved control apparatus comprising an electrical switch for connection in a control circuit for a temperature producing means, such as a pan or cooking vessel heating unit of an electric cook stove, the switch being actuated by a thermally responsive device subjected to two electric heating means arranged to provide opposing forces in the switch actuating device, one means providing heat according to the temperature of the cooking vessel on the heating unit and the other heating means providing heat according to the electrical resistance in a circuit having a manually adjustable variable resistance therein and also including an additional supply of heat during the energizing or "on" periods only of the heating unit. Preferably, the switch actuating device includes means to provide for opening the switch only upon a determinable differential in the opposing forces of the device so that the switch is operated by a positive movement and whereby the duration of the intermittent periods of energization may be determined by the setting of the differential means.

Other objects and advantages of the invention will be apparent from the following description of a preferred form thereof, reference being made to the accompanying drawings wherein.

Figure 3:
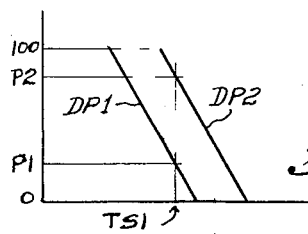
Figure 4:
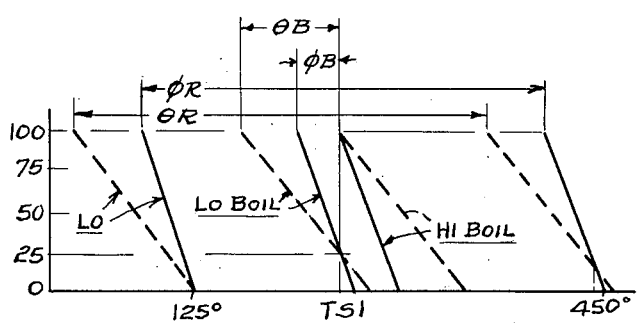

FIG. 3 is a graph illustrating the percentage of "on" time as a function of the knob or dial position of the control and the sensor temperature; and FIG. 4 is a graph illustrating the relationship between the degree of rotation of the temperature adjusting knob and the "on" periods at water boiling temperatures resulting from employment of different values of certain components of the control apparatus.

Figure 1:
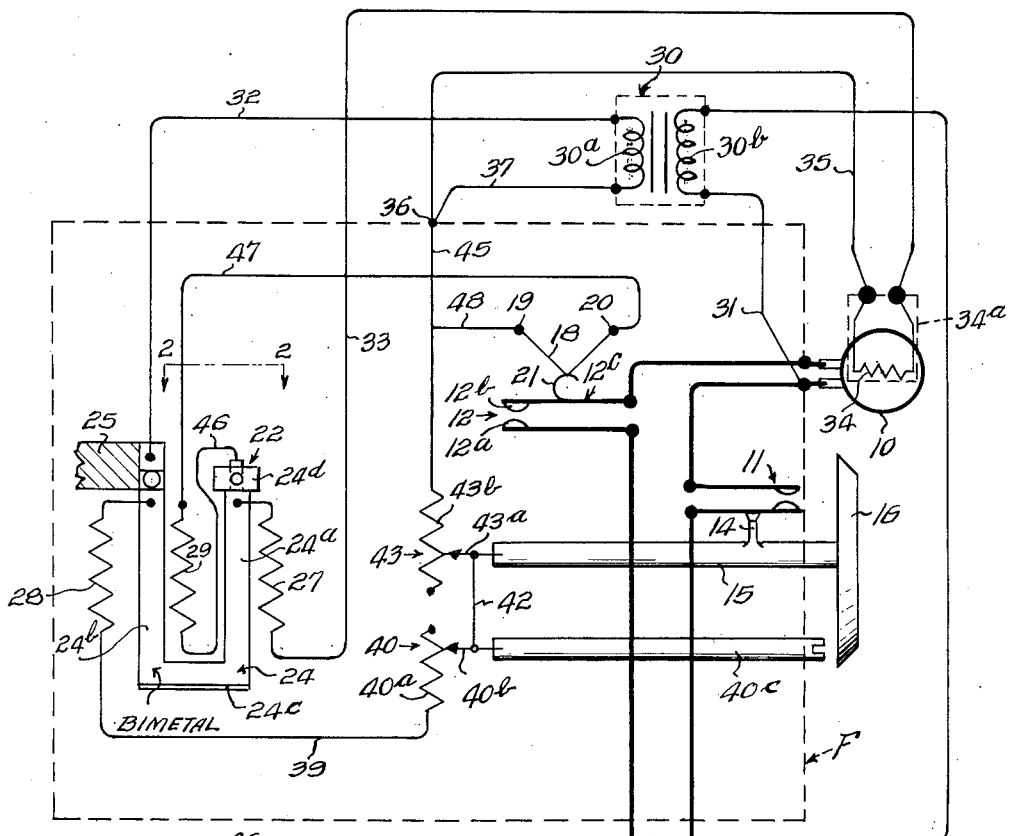
FIG. 1 is a schematic view of the control apparatus embodying the invention arranged to control an electric heating unit of an electric stove.

In the preferred form of the invention referred to, a control apparatus is shown for controlling a top heating unit or burner 10 of a conventional electric stove, not shown, arranged to heat a cooking pan placed thereon. As seen in FIG. 1, electrical power, in the form of 220 volts A.C., is supplied to unit 10 through lines L1 and L2 which are connected to suitable mains, not shown, of a conventional three-wire system, and the supply of power to the unit is controlled by a manually operated "on-off" switch 11 connected in line L2 and an automatically actuated switch 12 connected in line L1 to control the opposite side of the heater circuit. Switches 11 and 12 are mounted in a suitable control housing or frame, indicated generally at F, which may be of any conventional construction and for sake of clarity, the details are not shown.

Switch 11 is preferably opened and closed by a cam 14 attached to a shaft 15 rotatably mounted in frame F and which may be conveniently rotated by a knob or dial 16 attached to the end thereof. The dial 16 cooperates with indicia on a panel of the stove to indicate the control positions, as is decribed hereinafter, which panel and indicia are not shown since they are well known in the art. When dial 16 is in its "off" position switch 11 is opened by cam 14, but in all other positions of the dial the switch is closed.

Switch 12 comprises a fixed contact 12a and a contact 12b attached to the free end of a cantilever spring type contact arm 12c, normally biased to close contact 12b on contact 12a. Arm 12c is arranged to be drawn from contact 12a by the contraction of a "hot wire" 18, the ends of which are anchored to posts 19 and 20 respectively, and the intermediate portion thereof is connected to a bracket 21 on the contact arm but insulated therefrom. When current of a certain value flows through wire 18 the wire becomes heated and elongates, due to expansion, to permit contact arm 12c to close contact 12b on 12a and thereby complete the circuit for unit 10, assuming switch 11 has been closed as described. The type of construction and operation of switch 12 is commonly known as a "hot wire relay" and the details thereof are not shown to avoid unnecessary description.

Figure 2:
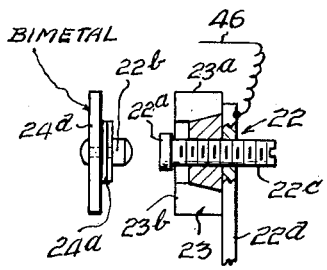
FIG. 2 is a view, partly broken away, taken along line 2—2 of FIG. 1 and on a larger scale.

The circuit for wire 18 is controlled by a switch 22 comprising a pair of contacts 22a and 22b, shown clearly in FIG. 2. Contact 22a is attached to the end of a screw 22c threaded in an opening through a fixed bracket 22d and a permanent magnet 23, which magnet is suitably attached to the bracket which in turn is fixedly supported on frame F. Contact 22b is attached to an outer end of a leg 24a of a thermally responsive device comprising a U-shaped bimetallic member 24, the outer end of leg 24b of which is attached to a fixed bracket 25 carried by the frame. Preferably, the yoke portion of member 24 has a flange 24c which stiffens this portion and prevents its flexing.

An iron strip 24d is attached to the outer end of leg 24a so as to be attracted toward the poles 23a and 23b of magnet 23 when leg 24a flexes to a predetermined distance from the magnet. Magnet 23 functions to cause a positive closing of contact 22b on 22a to thereby prevent "chattering" of the contacts as they approach engaging positions and the pull of the magnet requires an appreciable build-up of force in the bimetal to separate the contacts. The degree of pull of the magnet tending to hold the contacts closed can be regulated by adjusting the position of contact 22a relative to contact 22b by threading screw 22c in one direction or the other.

The metal of member 24 having the higher rate of expansion is on the outer face, as viewed in FIG. 1 or away from contact 22a, so that as leg 24a becomes heated it flexes towards contact 22a and as it cools it tends to move from the contact. When both legs of member 24 increase in temperature equally, leg 24a flexes upwardly, as viewed in FIG. 1 or to the left as seen in FIG. 2, and the lower end of leg 24b, flexes outwardly which counteracts the flexure of leg 24a so that the position of contact 22b relative to contact 22a is unchanged. More specifically, as leg 24b flexes upwardly, the yoke section of 24, held rigid by flange 24c, is tilted thereby to shift the base of leg 24a to correspond to the amount of flexure of the latter so that the relative position of contacts 22a and 22b is unchanged. Should the temperature of leg 24b reach a higher temperature than leg 24a, the latter will be tilted to shift contact 22b from contact 22a. It will be appreciated that by this arrangement, changes in ambient temperatures will not affect the movement of contact 22b relative to contact 22a.

Leg 24a is heated by an electric heating element 27, and leg 24b is heated by heating elements 28 and 29. These heating elements are connected in parallel circuits, and it will be seen that the heat produced by heater 27 affects leg 24a to tend to close switch 22 while the heat produced by heaters 28 and 29 affects leg 24b to tend to open switch 22. The bimetal member 24 is positioned so that the heat of the respective heaters affects only the legs of the member as described, and if desired, suitable insulators, not shown, may be used to properly confine the heating effect of the heaters.

The circuits for heaters 27, 28 and 29 are energized by the secondary coil 30a of a step-down transformer 30, the primary coil 30b of which has one terminal connected to the neutral line L3 of the three-wire power supply system, and the other terminal connected by wire 31 to one terminal of unit 10 so that the primary coil is energized by 110 v. when switch 11 is closed. The circuit for heater 27 comprises one terminal of secondary coil 30a, wire 32, legs 24b and 24a of bimetal member 24, heater coil 27, wire 33, resistance element 34, wire 35 to terminal 36, and wire 37 to the other terminal of the secondary. Resistance element 34 is the type which increases in resistance value as its temperature increases and vice versa, and it is sometimes referred to herein as a "sensor." This sensor is suitably mounted in a device 34a which maintains the element in thermal contact with a pan placed upon unit 10 but which shields the sensor from heat radiated by the unit. Resistance elements and mounting devices similar to sensor 34 and device 34a are familiar to those skilled in the art and therefore the details are not further disclosed. It will be appreciated that as the temperature of sensor 34 increases the electrical resistance thereof increases so that the current passing through heater 27 decreases, thereby decreasing the heating effect thereof on arm 24a.

The circuit for heater 28 includes secondary coil 30a, wire 32, a portion of leg 24b, heater coil 28, wire 39, coil 40a and movable contact arm 40b of a rheostat 40, wire 42 to a movable contact arm 43a of a rheostat 43, coil 43b of rheostat 43, and wires 45 and 37 to the other side of secondary coil 30a. Movable contact arm 43a of rheostat 43 is arranged to be moved along coil 43b by the rotation of shaft 15 according to the setting of dial 16. As the dial 16 is set for higher temperatures, contact 43a is positioned on winding 43b to increase the resistance in the circuit for heater 28. Contact arm 40b of rheostat 40 is arranged to be set by a shaft 40c rotatably mounted on frame F and having a slotted end for receiving a screwdriver by which the value of the resistance offered in the circuit of heater 28 can be adjusted according to the elevation of the location of the stove, the purpose of which appears hereinafter. It will be understood that it may be desirable to provide a limiting resistor in series with rheostat 43 to provide suitable resistance values in the rheostat circuit.

The circuit for heater 29 includes one terminal of secondary 30a, wire 32, bimetal member 24, contacts 22b and 22a, bracket 22d, wire 46, heater coil 29, wire 47, hot wire 18, wires 48, 45 and 37 to the other terminal of coil 30a. It will be seen that heater 29 is energized only during the time switch 22 is closed and that its heating contributes to the switch opening action of member 24.

The operation of the apparatus is as follows: assuming that a pan containing food is placed on heating unit 10 and dial 16 is turned to indicate a cooking temperature of 300° F., for example, switch 11 is closed and a circuit is established therethrough to primary winding 30b, through wire 31, and to line L3 thereby energizing the secondary winding 30a which establishes a current flow through the circuits for heater coils 27 and 28, as described. Since heater coil 27 is in series with sensor 34, and the resistance value of the latter is low because of its relatively low temperature, a flow of current is established through heater 27 which is greater than through heater 28. This condition quickly heats 24a to a temperature above that of leg 24b and leg 24a then deflects and closes switch 22, thus establishing a circuit through hot wire 18 which quickly heats to close switch 12 and close the circuit for unit 10. Heater 29 is now energized through switch 22, but the combined heat of heaters 28 and 29 is not sufficient to effect a counteraction in leg 24b to leg 24a to open contacts 22b and 22a.

As the temperature of sensor 34 increases toward that desired, the resistance offered thereby increases to the point at which the heat produced by heater 27 is insufficient to cause leg 24a to maintain switch 22 closed as against the heat supplied by heaters 28 and 29, and switch 22 will then reopen. When switch 22 opens, hot wire 18 quickly cools to re-open switch 12 and de-energize unit 10 and the heater 29. As long as sensor 34 is at a temperature which provides a resistance lower than that provided according to the setting of rheostat 43, heater 27 generates sufficient heat over that of heater 28 to cause bimetal 24a to reclose switch 22, thereby energizing hot wire 18 to reclose switch 12 thereby re-energizing heating unit 10 and heater 29. As sensor 34 approaches the temperature indicated by the dial setting, the durations of the "off" phases of the control cycles increases due to the reduction of heat generated by heater 27.

The amount of heat generated by resistance 29 and the pull of magnet 23 tending to maintain contact 22b on contact 22a affect the duration of the "on" periods of the heater in relation to the temperature or resistance of the sensor. This condition is graphically illustrated in FIG. 3, wherein the vertical axis of the coordinates indicates the percentage of "on" time and the horizontal axis indicates the temperature of the sensor, the temperature increasing to the right. Line DP1 represents these conditions when dial 16 is set for one position and line DP2 represents these conditions when dial 16 is set for a higher temperature. From this graph it will be seen that the circuit for heating unit 10 will be energized constantly until a certain temperature below that desired is attained, after which the percentage of "on" time decreases as the temperature approaches that desired. The angle of slope of lines DP1 and DP2 depends on the value of resistor 29 and the pull of magnet 23 on arm 24a, a higher heat output of heater 29 and a lower pull of the magnet on the arm tend to decrease the angle of the lines DP1 and DP2 with the horizontal axis, or to cause cycling of the heater circuit at a wider temperature differential with respect to that desired. This angle can be changed, therefore, by adjusting the screw 22c to vary the attraction of arm 24a by magnet 23 or by changing the resistance value of heater 29.

In connection with providing a rate of boil control over a given sector of dial 16, it will be seen that if TS1 is the temperature of sensor 34 when water is boiled when dial 16 is set for DP1, the percentage of "on" time is P1, which is about 25% "on" time. If dial 16 is then advanced to the DP2 position, the temperature of the sensor remains unchanged snice the boiling temperature remains constant; however, it will be seen that the "on" time for the boiling temperature is increased to P2 or about 80% so that the rate of boiling is substantially increased. It will be apparent that the boiling temperature for different localities will vary due to differences in altitude and by adjusting rheostat 40 by shaft 40c at the point of use of the cook stove so that a low boiling rate occurs when dial 16 is set for "low boil," the control can be readily calibrated in the field.

From the foregoing, it will be apparent that the angular movement of dial 16 throughout the boiling range can be established as desired by selecting the value of resistance 29 or adjusting the pull of magnet 23 on arm 24a, as mentioned previously. The range of this selection is graphically illustrated in FIG. 4 wherein the vertical axis represents percentage of "on" time of heater 10 while the horizontal axis indicates the temperature of sensor 34. The full sloping lines indicate the angular range of adjustment of dial 16 for one set of values for resistance 29 and magnet pull, while the broken sloping lines represent the angular range of adjustment of the dial for another set of these values. Assuming that the range of temperature control is from 125° F. to 450° F., approximately, the dial range for the first set of values is represented at $\phi R$ and the dial range for the second set of values is $\theta R$. When the sensor is at water boiling temperature TS1 (approximately 212° F.), the dial range to control rate of boiling for the first set of values is represented by the lines spaced by an angular difference of $\phi B$, the left hand line passing through the low boiling rate at which the heater is energized 25% of the time and the line passing through the point at which the heater is on 100% of the time at TS1. By increasing the heat input of heater 29 or decreasing the pull of magnet 23 on arm 24a, the slope may be lowered as indicated by the broken lines so that at TS1 the angular spacing of dial 16 from the low boiling rate of 25% "on" time to the high boiling rate of 100% "on" time is represented at $\theta B$. It will be seen that this angle is substnatially greater than $\phi B$.

By our invention, an improved control apparatus is provided having a control dial movable to obtain a wide temperature range of adjustment while including a rate of boil zone over a convenient portion of the dial movement, while boil rate can be readily calibrated or established for accurate operations according to local conditions or to specifications of various stove manufacturers.

Although we have shown but a single embodiment of the invention, it is to be understood that other embodiments, modifications and adaptations of the invention may be employed, all falling within the scope of the invention as defined by the claims which follow.

We claim:

1. Control apparatus comprising an electric switch for controlling a heater or the like, a device for operating said switch including two opposed thermally responsive members, one of which is arranged to overpower the other to operate said switch, a first electrically energized heating means for heating one member, second and third electrically energized heating means for heating the other of said members, means to energize said first heating means including a circuit having a temperature responsive resistance therein subjected to the temperature condition to be controlled and operative to vary the flow of current in said first heating means according to changes in resistance therein, means to control the energization of said second heating means including a manually adjustable rheostat, and a circuit for energizing said third heating means controlled in accordance with operation of said switch to increase the heating of the member by said third means during the time said switch is in one of its operating positions only.

2. Control apparatus comprising an electric switch for controlling a heater or the like, a device for operating said switch including two opposed thermally responsive members, one of which is arranged to overpower the other to operate said switch, a first electrically energized heating means for heating one member, a second and a third electrically energized heating means for heating the other of said members, means to energize said first heating means including a circuit having a temperature responsive resistance therein subjected to the temperature condition to be controlled and operative to vary the flow of current in said first heating means according to changes in resistance therein, means to control the energization of said second heating means including a manually adjustable rheostat, a circuit controlled in accordance with operation of said switch to energize said third heating means only during the time said switch is in one operating position, and means to cause said device to operate said switch from one position to the other only in response to a substantial differential in forces in said device.

3. Control apparatus comprising an electric switch for controlling a heater or the like, a device for operating said switch including two opposed thermally responsive members, one of which is arranged to overpower the other to operate said switch, a first electrically energized heating means for one member, a second and a third electrically energized heating means for the other of said members, means to energize said first heating means including a circuit having a temperature responsive resistance therein subjected to the temperature condition to be controlled and operative to vary the flow of current in said first heating means according to changes in resistance therein, and circuit means to control the energization of said second and third heating means including first and second rheostats, respectively, one of said rheostats having a dial adjustment readily accessible for manual adjustment, and said circuit means being adapted to interrupt energization of said third heating means when one of said thermally responsive members overpowers the other.

4. Control apparatus comprising a U-shaped bimetal member, a support for the outer end of one leg of said member, a contact on the outer end of the other leg and forming a contact for an electric switch for controlling a heater or the like, a first electrically energized heating means for heating one of said legs of said member, a second and a third electrically energized heating means for heating the other leg of said member, means to energize said first heating means including a circuit having a temperature responsive resistance therein subjected to the temperature condition to be controlled and operative to vary the flow of current in said first heater according to changes in resistance therein, means to control the energization of said second heating means including a manually adjustable rheostat, and a circuit controlled in accordance with operation of said switch to increase the heat output of said third heating means during the time said switch is in one operating position.

5. Control apparatus comprising an electric switch for controlling a heater or the like, a device for operating said switch including two opposed thermally responsive members, one of which is arranged to overpower the other to operate said switch, a first electrically energized heating means for heating one of said members, second electrically energized heating means for heating the other of said members, means to energize said first heating means including a circuit having a temperature responsive resistance therein subjected to the temperature condition to be controlled and operative to vary the flow of current in said first heating means according to changes in resistance therein, means to control the energization of said second heating means to increase the heat output thereof during the time said switch is in one operating position and to decrease said heat output during the time said switch is in the other operating position, and magnet means acting on one of said members to effect positive responses thereof corresponding to different predetermined temperatures of said temperature responsive resistance.

References Cited in the file of this patent

UNITED STATES PATENTS

| | | |
|---|---|---|
| 2,655,859 | Bell | Oct. 20, 1953 |
| 2,762,997 | Boddy | Sept. 11, 1956 |
| 2,859,305 | Happe | Nov. 4, 1958 |
| 2,910,569 | Boddy | Oct. 27, 1959 |